United States Patent [19]

Wright

[11] 4,082,034
[45] Apr. 4, 1978

[54] COTTON PRESS

[76] Inventor: Luther R. Wright, Rte. 1, Roscoe, Tex. 79556

[21] Appl. No.: 758,695

[22] Filed: Jan. 3, 1977

[51] Int. Cl.² .............................................. B30B 5/00
[52] U.S. Cl. ........................................ 100/240; 56/36
[58] Field of Search ............... 100/240, 241, 245–253, 100/100, 226, 233; 56/36–38, DIG. 1, 432, 30; 298/8

[56] References Cited

U.S. PATENT DOCUMENTS

| 3,422,751 | 1/1969 | Hubbard | 100/233 |
| 3,734,563 | 5/1973 | Schlueter | 298/8 |
| 3,759,171 | 9/1973 | Vocker et al. | 100/100 |
| 3,797,382 | 3/1974 | Muzzi et al. | 100/100 |

Primary Examiner—Leonard D. Christian
Attorney, Agent, or Firm—Clarence A. O'Brien; Harvey B. Jacobson

[57] ABSTRACT

A device for attachment to a storage box of a cotton stripper machine to permit the operator of said machine to mechanically tamp or press cotton as dumped from the storage box into an adjacent trailer for receiving the picked cotton. The press is specifically designed for easy and ready attachment to the conventional type storage boxes of cotton strippers and is hydraulic actuated from the same hydralic system as is used on the cotton stripper machine.

8 Claims, 5 Drawing Figures

COTTON PRESS

BACKGROUND OF THE INVENTION

1. Field of the Invention

This invention relates generally to devices for attachment to cotton stripper tractors and the like for use by an operator of same to tamp or compress cotton which is dumped from said stripper into an associated cotton trailer.

2. Description of the Prior Art

A common problem with known type compacting devices for use with street sweeping apparatus, and other similar collecting machines, is that the devices operate to compact material internally of the structure rather than externally thereof.

A problem in cotton stripping is that the cotton stripping machine or tractor gathers the cotton and transfers same to a storage bin normally supported as part of the overall machine structure. Once this storage bin or box is filled, it is then dumped by hydraulic or other power mechanism into a trailer which is normally provided in the field at a convenient point. These cotton trailers have normal capacities ranging from 2–10 bales. When the storage box of the cotton stripper is filled, the operator of the tractor stripper equipment drives along side the parked trailer, and the storage box is opened mechanically and the cotton emptied into the trailer from the side of the tractor or stripper. As the trailer becomes filled with cotton, it is necessary that it receive some pressing in order to increase the capacity of the trailer. The weight on the trailer itself is rarely a problem, so if more cotton can be placed in the trailer or packed a little tighter, it lessens the number of trips to a cotton gin. Normally, the operator of the cotton picking equipment has to climb into the trailer and from time to time stomp the cotton with his feet. This, of course, is time consuming as well as being inconvenient and unsanitary.

Known prior art devices which may be pertinent to this invention are as follows U.S. Pat. Nos.: 1,314,437 Aug. 26, 1919, 2,789,067 Apr. 16, 1957, 3,412,532 Nov. 26, 1968, 3,422,751 Jan. 21, 1969.

None of these prior art devices offers the new and unique features of the invention disclosed herein.

SUMMARY OF THE INVENTION

An object of the present invention is to provide an attachment for cotton strippers which will permit the operator thereof to tamp the cotton after it has been dumped from the stripper or storage box into an associated trailer.

Another object of the present invention is to provide an attachment for cotton stripping machines which may be readily and easily mechanically attached to the conventional storage box of such equipment and then may just as easily be operated from the conventional power assist mechanism of the stripper tractor by the operator thereof to perform a compacting or pressing operation on cotton which has been dumped into other transport mechanism.

A further object of the present invention is to provide a hydraulic operated press structure having a triangular-shaped pressure member with a flat cotton engaging surface thereon which is readily usable with cotton pickers in the field today.

The cotton press apparatus of this invention has a number of important features. It is structurally and mechanically rigid and may be quickly and easily mechanically attached to the storage box of a conventional type cotton picker or stripper. Such cotton stripper structure as mounted upon modified tractor equipment normally receives the cotton which has been stripped from the plants in the field and fed by appropriate means into the storage box. The storage box is normally mounted for a dumping operation through power assist means operated under the control of the tractor operator. This power assist mechanism very commonly is by hydraulic pressure control. Appropriate fluid actuated cylinders are connected to the respective units so as to tilt the storage box from a substantially horizontal position to a substantially vertical one and then an upper closable cover unit may be opened to permit the cotton to be dumped from the storage unit.

The cotton press attachment of this invention is designed for attachment to the funnel-shaped trough surface of the main storage box unit and also supports and mounts dual power pistons for actuation by the same hydraulic fluid as the operation of the power assist mechanism for the dumping of the storage box as well as the opening of the lid thereof. A triangular-shaped pressure bar or tamping member having a flat cotton engaging surface is provided on the external ends of the piston rods of the power cylinders for engaging with the upper surface of cotton which has been dumped by the aforesaid storage container structure into an associated trailer or other transport means in or near the cotton field.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
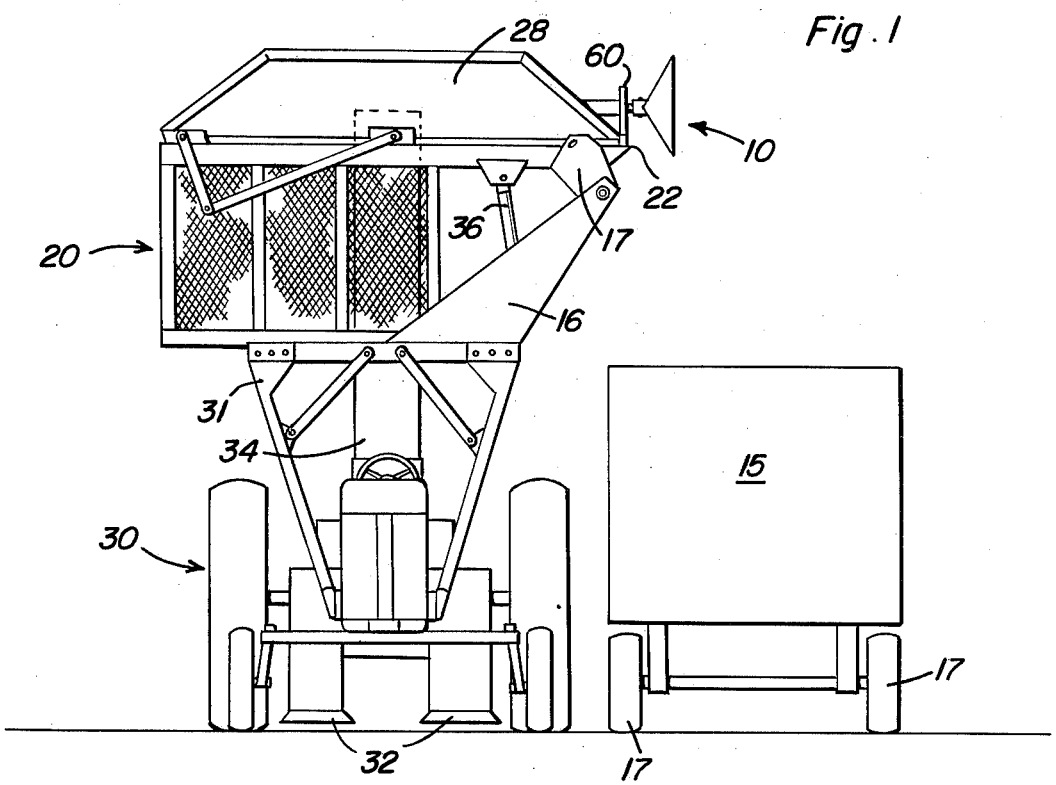
FIG. 1 is a side elevational view of the overall structure as in use with a cotton trailer.

Looking at FIG. 1 of the drawings, reference numeral 10 indicates the cotton press attachment of this invention as applied to a conventional cotton stripper machine. The stripper machine normally has mounted on an upper portion thereof a storage container or box 20 with the tractor mount 30 for moving the picker or stripper through the cotton field. The stripper structure indicated in general by reference numerals 32 feed the picked cotton by appropriate mechanism through a feed channel 34 and an opening 35 in the side of the openable lid 28 of the storage box structure for collection of the picked cotton within said storage box. Main support structure for pivotally mounting the storage box supports 17 is indicated by reference numeral 16. These main support members 16 are appropriately mounted on tractor support structure 31 of well known type. Normally, a power cylinder 36 connected by appropriate hoses 38, for feeding either pneumatic or fluid pressure to the respective ends of the cylinder for operation of a power piston therewithin, is used to operate the mechanism.

Figure 2:
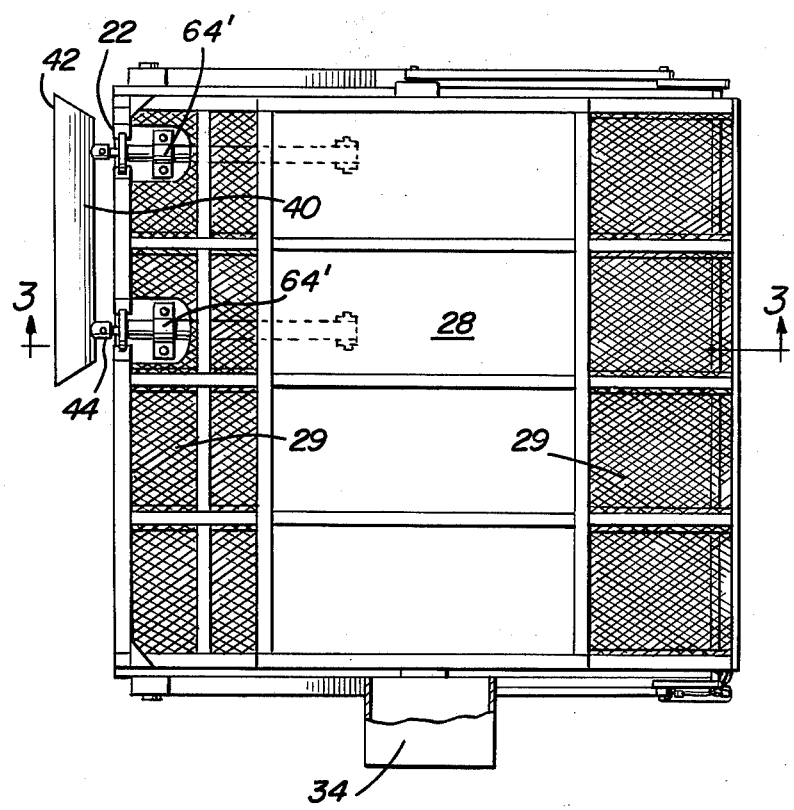
FIG. 2 is a top plan view of the storage box of a conventional type cotton stripper.
Figure 3:
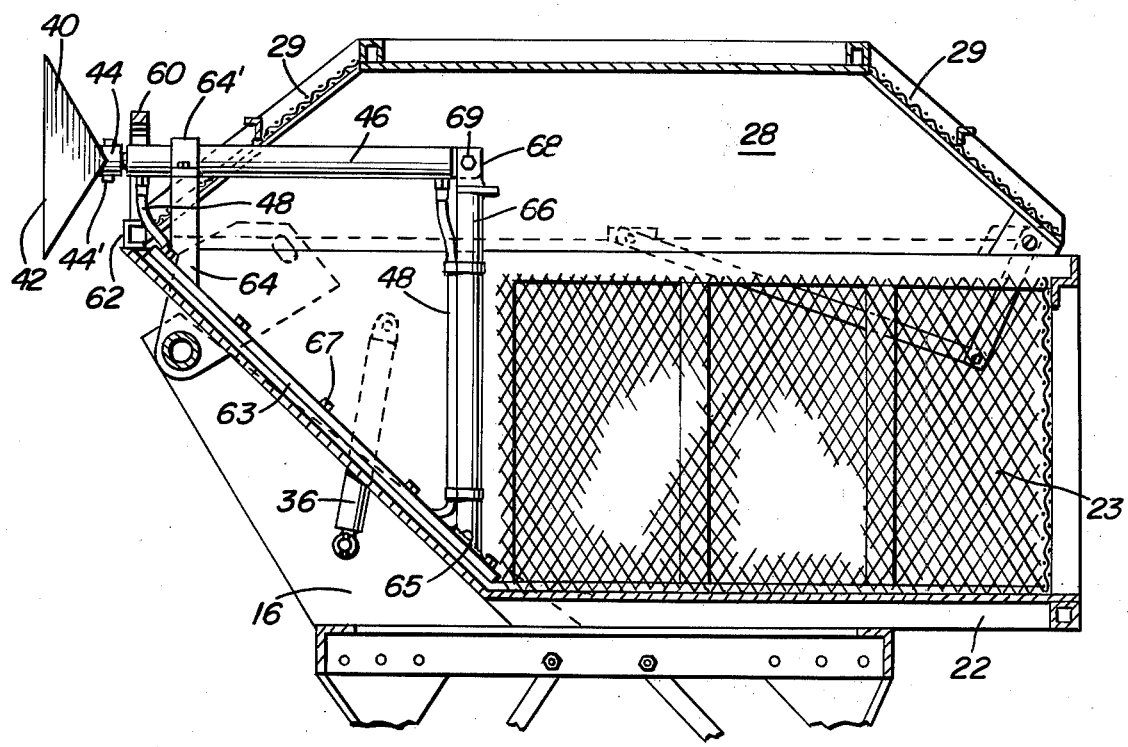
FIG. 3 is a side elevational view, partly in cross section, taken generally along line 3—3 of FIG. 2.
Figure 4:
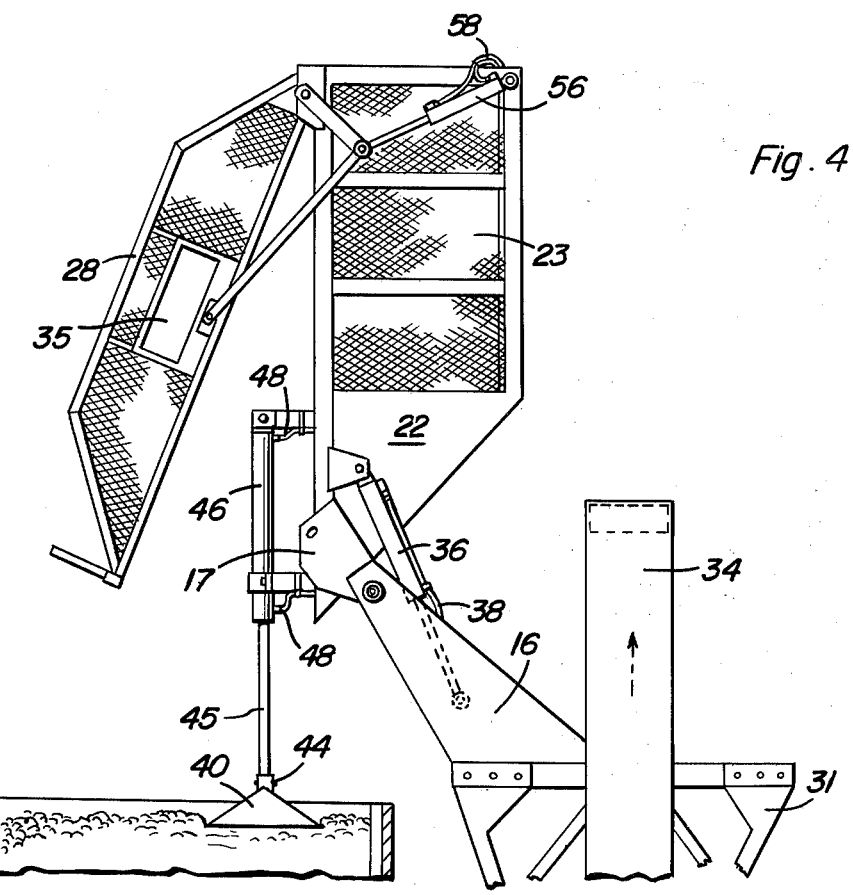
FIG. 4 is a side elevational view of the device in the process of pressing cotton.

As best seen in FIGS. 3 and 4, the power cylinder 36 is shown closed and in extended position. The main storage box 22 may be provided with metal sides of expanded wire mesh or expanded metal 23 and this storage area is normally filled with the storage box in horizontal position as best seen in FIGS. 1, 2 and 3. The lid portion 28 is normally closed as in these Figures. The lid portion 28 is provided with expanded metal or wire mesh portions 29.

As best seen in FIG. 3, the main element of the cotton press attachment is the elongated triangular-shaped bar member 40 having a flat cotton engaging surface 42. This member is mounted by appropriate projections 44 to the outer ends of piston rods 45 associated with the power cylinders 46. Each end of the two power cylinders 46 have appropriate hoses 48 connected thereto for operation of the power piston, not shown therewithin. The hoses 48 connected at each of the ends of the dual power pistons 46 are appropriately connected to controls on the tractor control console for easy operation thereof by the operator of the stripper machine.

A primary support member 63 is provided for supporting members 64 and 66 which retain the respective end portions of the power cylinder 46. A pair of flanges 68 connect to one end of the power cylinder by a pin 69 as best seen in FIG. 3. The supports 64 and 66 are appropriately attached to the base member 63 welding 65 or the like. A bracket 64' holds cylinder 46 to support 64. Appropriate bolts 67 are used to attach this overall structure to the front angled portion of the primary storage box 22 with the brackets or supports 64, 66 being mounted on opposite sides of the main support plate forming the front angled portion of box 22 at an angle of approximately 45° thereto.

Figure 5:
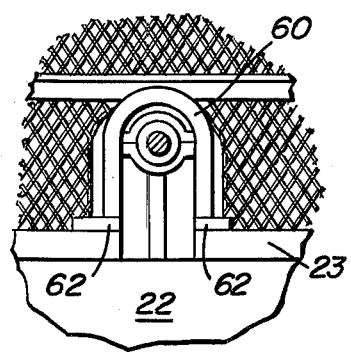
FIG. 5 is a fragmentary portion showing the arch bar structure.

FIG. 5 shows in detail the construction of an arch bar 60 for covering and protecting the outer end of power piston 46. This arch bar 60 may be mounted to the front edge of the storage box by a U-shaped member 62 (FIG. 3). The member 62 may fit over the lip formed by the dumping edge of the storage box.

As can best be seen in FIGS. 1 and 4, when the storage box of the cotton stripper is filled to capacity, the tractor operator drives to the edge of the cotton field where a conventional cotton trailer 15 mounted on four wheels 17 is provided. The hydraulic or penumatic dumping controls are then actuated to tilt the storage box to the vertical position, as in FIG. 4, whereupon power piston cylinder 56 is operated through hoses 58 similar to the ones already described for opening the storage box lid 28 to permit the cotton to be dumped. After the cotton is completely dumped from the storage box, the operator then operates the power piston cylinder 46 of the cotton press of this invention to extend the piston rod 45 and apply pressure upon the triangular-shaped pressure bar 40. The flat surface 42 of this pressure bar will appropriately compact the cotton as desired by the operator. The portions 44 as connected to the ends of piston rods 45 may be pivotally mounted thereto by means of pins 44'.

The cotton press attachment of this invention when attached to a cotton stripper permits the operator to compact more cotton into the associated transport trailers 15 and thus greatly increase the total capacity thereof. This enables more cotton to be loaded and transported per trailer and increases substantially the overall efficiency of the entire operation which in turn will make such operation more profitable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An attachment for the dumpable storage box of cotton picker apparaatus comprising; a main support plate, brackets mounted on opposite sides of said main support plate at an angle of approximately 45° thereto, at least one power ram structure attached to the brackets so the operating action thereof will be in a plane approximately 45° from the plane of the main support plate, and a flat surface member suitable for contacting loose cotton attached to the power ram structure for operation thereby, and means for attachment of the flat surface member to the power ram structure which means being a pivotal connection.

2. The structure as set forth in claim 1 together with control means connected to the power ram structure for easy control by the operator or the cotton stripper.

3. The structure as set forth in claim 1, wherein two power ram structures are provided, said rams being spaced a distance apart on the support structure, and one ram structure being connected at one end of the flat surface cotton engaging member and the other ram structure being connected at the other end of the cotton engaging member for a balance of force on the member and the cotton being pressed thereby.

4. The structure as set forth in claim 3, wherein the flat surface cotton engaging member is basically triangular shaped in cross section, and mounts provided at ends of the respective ram structures and arranged at the apex of the triangle opposite to the flat surface of the member.

5. The structure as set forth in claim 4, further including arch bars mounted on the edge of the storage box at each of the ends of the power ram structures for appropriate protection thereof.

6. The structure as set forth in claim 1, wherein an arch bracket is provided for association with the main support plate to protect the power ram structure.

7. The structure as set forth in claim 6, wherein two of the power ram structures are provided, with one each being connected at each of the respective ends of the flat surface cotton engaging member.

8. The structure as set forth in claim 1, wherein two of the power ram structures are provided, with one each being connected at each of the respective ends of the flat surface cotton engaging member.

* * * * *